June 17, 1969    J. W. FRANDSEN ET AL    3,450,220
AUTOMATIC DRAWBAR HITCH
Filed April 4, 1967
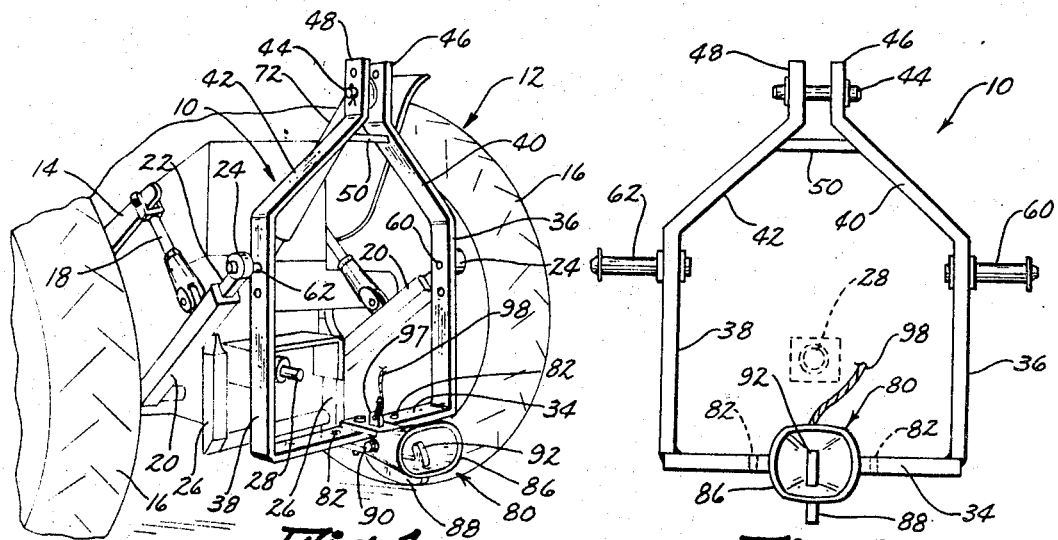
Fig. 1    Fig. 2
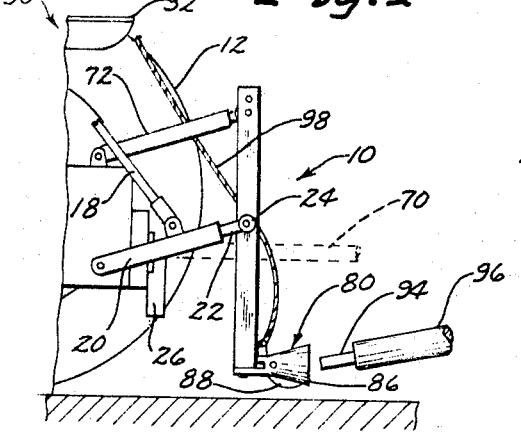 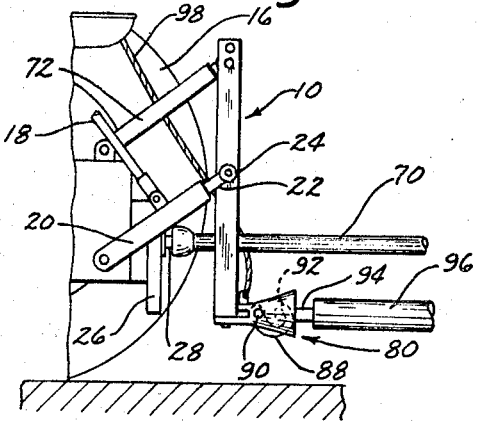
Fig. 3    Fig. 4
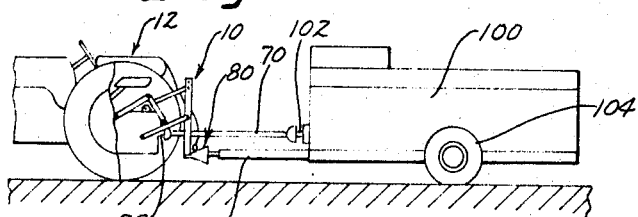
Fig. 5
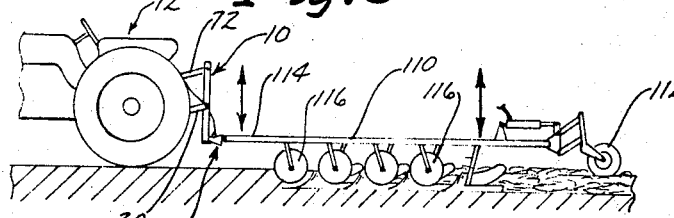
Fig. 6
INVENTORS
JACK W. FRANDSEN
WALLACE C. FRANDSEN
BY
Dich, Zarley, McKee & Thomte
ATTORNEYS United States Patent Office 3,450,220
Patented June 17, 1969

3,450,220
AUTOMATIC DRAWBAR HITCH
Jack W. Frandsen and Wallace C. Frandsen,
both of Roland, Iowa 50236
Filed Apr. 4, 1967, Ser. No. 628,334
Int. Cl. B60d *1/00;* A01b *63/00, 33/00*
U.S. Cl. 180—14                                    1 Claim

ABSTRACT OF THE DISCLOSURE

A drawbar detachably connected to the lift arms and stabilizer arm on the rear end of a tractor and a coupling unit on the lower horizontal portion of the drawbar detachably connected to the tongue of a trailer vehicle, the drawbar being selectively vertically positioned as required to connect the coupling unit to the trailer tongue. The drawbar has a completely open interior area through which a shaft connected to the power take-off on the tractor may movably extend.

---

The conventional tractor-trailer hitch involves a drawbar and a tongue which requires the operator of the tractor to step down from the driving station on the tractor to insert the pin through the aligned openings in the tongue and tractor drawbar. It is extremely difficult to back a tractor into the position required for the tongue and tractor drawbar to be in alignment with each other for being connected together. Thus, using conventional equipment, it is necessary to manually pivot the tongue back and forth or roll the trailer-vehicle back and forth until the alignment is obtained. On the other hand, the tractor may be repositioned to make the connection.

This invention involves a streamlined detachable drawbar which may be quickly attached and removed from the pair of lift arms and stabilizer arm on a tractor. The auxiliary drawbar unit includes a horizontal member with upstanding vertical integral bar members which are pivotally connected to the lift arms of the tractor. Extending upwardly from the upper ends of the vertical bar members are portions which intersect at the outer end of the stabilizer member and are pivotally connected thereto. The entire area defined by the inner surfaces of the vertical bar members, the horizontal bar member and the converging bar portions is open and thereby permits easy access to the power take-off on the tractor and accordingly permits the extension shaft to extend through the auxiliary drawbar unit to a connection on a trailer vehicle. Complete freedom for turning with the power take-off hooked to the trailer is permitted by the large opening formed in the auxiliary drawbar unit. Moreover, substantial freedom of movement is limited in raising and lowering the drawbar unit without interfering with the power take-off shaft extending therethrough.

A quick release and automatic coupling unit is secured to the horizontal drawbar member and is manually operated by a control member in the driving station on the tractor. Thus, the drawbar may be lowered to the elevation of the outer end of the trailer tongue and then the tractor backed up causing the tongue to be automatically guided into locking engagement with the coupling unit. The auxiliary drawbar may then be raised by the lift arms to the normal driving position. If a ground working implement is being used the auxiliary drawbar may be used to raise and lower the implement relative to the ground. The disconnecting of the trailer tongue is accomplished by simply pulling the control lever which unlatches the coupling unit from the tongue and if desired the auxiliary drawbar may be lowered to the ground to eliminate the tongue dropping to the ground when it is disengaged from the coupling unit. It is seen that all of these operations may be performed without the driver ever leaving the driving station on the tractor. Moreover, should it be desired to remove the auxiliary drawbar from the tractor, it is necessary only to disconnect it at three points.

These and other features and advantages of this invention will become readily apparent to those skilled in the art upon reference to the following description when taken into consideration with the accompanying drawings, wherein:

FIG. 1 is a fragmentary perspective view of the auxiliary drawbar mounted on a tractor;

FIG. 2 is a rear elevation view of the drawbar unit;

FIG. 3 is a fragmentary side elevation view of the drawbar unit mounted on a tractor wherein the lift arms have positioned the coupling unit for connection with a trailer tongue;

FIG. 4 is a view similar to FIG. 3 showing the coupling unit connected to the trailer tongue and raised to the normal driving elevation;

FIG. 5 is a reduced in scale side elevation view of a tractor connected to a feed mixing wagon having a power take-off connection between the power take-off on the tractor and the wagon; and FIG. 6 is a side elevation view of a tractor connected through the drawbar unit to a ground working implement wherein the drawbar is used to control the depth of the implement in working the ground.

In FIG. 1 the drawbar unit of this invention is referred to generally by the reference numeral 10 and is shown mounted on the rear end of a tractor 12.

The tractor 12 includes a power arm 14 on each side thereof extending rearwardly adjacent the rear wheels 16 and is connected through a link member 18 to oppositely disposed pivotal lift arms 20. The lift arms include extendable members 22 which have eye elements 24 on their outer ends. The lift arms 20 are limited against lateral movement by vertical guide bars 26 on opposite sides of a power take-off shaft 28. Thus the lift arms 20 may move up and down along the vertical guide members 26 but cannot move laterally inwardly.

A driving station 30 is provided on the tractor 12 and includes a seat 32.

Referring now to FIG. 2, the auxiliary drawbar unit is best seen and includes a horizontal bar portion 34 having vertical upright portions 36 and 38 at opposite ends thereof which terminate in upper portions 40 and 42 which extend upwardly and inwardly in converging relationship and are interconnected by a pin 44 connected to parallel upper vertical end portions 46 and 48. A small brace portion 50 is provided adjacent the upper ends of the converging portions 40 and 42.

Adjacent the juncture of the bar portions 36 and 40 and 38 and 42 are outwardly extending pins 60 and 62. It is seen that the auxiliary drawbar frame 10 is completely open such that the power take-off 28 is readily accessible and an extendable shaft 70 connected thereto (FIGS. 3 and 4) may move horizontally as when the tractor is turned or the drawbar unit 10 may be raised and lowered without interfering with the operation of the power take-off 28.

It is further seen that the auxiliary drawbar unit 10 is symmetrical in front and back views and thus may be mounted with either side facing the tractor.

The laterally outwardly extending pins 62 are detachably received in the eye portions 24 on the lift arms 20 while the pin 44 is detachably engaged by the outer end of a stabilizer member 72 pivotally mounted on the tractor between the lift arms 20. The lift arms 20 may swing outwardly relative to the guide members 26 to permit their being slipped over the pins 60 and 62.

A coupling unit 80 is bolted through one of a series of holes 82 on the horizontal bar portion 34. The coupling unit includes a mouth portion 86 opening rearwardly and converging at its connection to the horizontal bar portion 34. A latch member 88 is pivotally connected in the mouth member 86 on a pin 90 and includes an upwardly extending hook portion 92 for engagement in an opening in the end of a tongue portion 94 on a trailer tongue 96 as seen in FIG. 4. A rearwardly and upwardly extending portion 97 is connected to the latch 88 and in turn is connected by a rope 98 or the like which extends to the driver station 30 on the tractor 12 adjacent the driver seat 32 as seen in FIG. 3. The latch element 88 is normally in its closed position as shown in FIG. 1 but upon engagement by the tongue portion 94 as seen in FIGS. 3 and 4, it is pivoted downwardly and allows the tongue portion to ride over the upper end of the hook portion 92 such that it drops into an opening formed therein and then returns to its normal closed position. The latch 88 may be pivoted downwardly and thus the hook disengaged from the tongue portion 94 by pulling on the rope 98 whereby the latch member 88 pivots about the axis of the pin 90. It is seen that the converging sidewalls of the mouth 86 serve to guide the tongue portion 94 into the mouth 86 for the latch 88 to be coupled to the tongue portion 94 automatically. First, the drawbar unit 10 is lowered by the lift arms 20 to the position of FIG. 3 wherein the coupling unit 80 is on the same horizontal plane as the tongue portion 94. The tractor 12 is then backed rearwardly until the connection with the tongue portion 94 is made. Then, the drawbar 10 is raised to the position of FIG. 4 which is its normal operating position above the ground. When it is desired to disengage the tongue 96 from the drawbar unit 10 it is only necessary to pull the cord 98 but if as is seen in FIG. 5 a considerable portion of the load of the trailer vehicle is on the tongue 96 it would then be desirable to lower the lift arms 20 such that the tongue is adjacent the ground and thus it will not be dropped while being disconnected. The trailer 100 in FIG. 5 is a feed mixing wagon which is operated by the power take-off shaft 70 extending between the power take-off 28 on the tractor and the power take-off unit 102 on the forward end of the trailer 100. It is seen that this trailer unit includes only a single pair of rear support wheels 104 which necessarily places a substantial load on the tongue 96 which would make manual hitching of the trailer to the tractor extremely difficult. However, with the drawbar unit 10 the connection is easily made.

In FIG. 6 a ground working implement 110 having a single rear support wheel 112 is shown connected through a tongue 114 to the drawbar unit 10 on the tractor 12. It is appreciated from this view that the operation of the lift arms 20 permits selectively adjusting the depth of the ground working tools 116. The versatility of the drawbar unit 10 is such that the implement 110 may be raised entirely out of the ground by use of the lift arms 20 or lowered to any desired working depth.

Some changes may be made in the construction and arrangement of our automatic drawbar hitch without departing from the real spirit and purpose of our invention.

We claim:
1. In combination,
a tractor having a pair of lift arms pivotally extending rearwardly therefrom,
a stabilizer arm disposed between said lift arms and extending rearwardly from said tractor,
power means connected to said lift arms for raising and lowering them,
a detachable hitch assembly comprising a frame having a vertically disposed bar member pivotally and detachably connected to each of said lift arms, a horizontally disposed bar member rigidly interconnecting the lower ends of said vertical bar members, inwardly and upwardly extending and converging portions rigidly connected to said vertical members pivotally and detachably connected to the outer end of said stabilizer member at their point of intersection, said vertical bar members, horizontal bar member and said converging bar portions defining a continuous rigid and integral frame being substantially open throughout its entire inner area, and
a drawbar coupling unit rigidly mounted on said horizontal bar and having a rearward extending mouth member having a connecting means, control means connected to said connecting means remotely operatively moving it between open and closed positions,
said connecting means being in a closed position when said mouth is closed and in an open position when said mouth is open,
said lift arms being selectively movable to position said coupling unit on the ground and at a predetermined elevation above the ground for selective engagement of said coupling unit with a tongue member,
said lift arms and said stabilizer being parallel to each other and being of such a length to maintain said frame in a vertical plane when being raised and lowered,
said tractor including a power take-off drive shaft having an extended longitudinal axis extending rearwardly between said lift arms and through said frame opening,
said tractor having a driving station and said control means being connected to said connecting means for remotely operating said connecting means, said control means including a portion in said driving station whereby the driver of said tractor may remain in said driving station while engaging and disengaging a tongue,
each of said vertical bar members include a horizontal outwardly extending pin rigidly connected thereto and each of said lift arms including an opening in which one of said horizontal pins is detachably received, said horizontal pins being adjacent the juncture of said vertical bar and said converging portion, and
said frame having a substantially smooth interior surface defining said opening therethrough.

References Cited
UNITED STATES PATENTS

| 2,321,516 | 6/1943 | Robertson | 172—7 |
| 2,341,807 | 2/1944 | Olmstead | 280—446 |
| 2,441,285 | 5/1948 | Pfeiffer | 280—477 |
| 2,579,274 | 12/1951 | Richey | 280—460 |
| 3,299,979 | 1/1967 | Restall | 180—14 |

FOREIGN PATENTS

| 1,126,326 | 7/1956 | France. |
| 807,058 | 1/1958 | Great Britain. |

A. HARRY LEVY, *Primary Examiner.*

U.S. Cl. X.R.

172—47, 248; 180—53; 280—479